United States Patent
Ting

(10) Patent No.: US 6,397,283 B1
(45) Date of Patent: May 28, 2002

(54) METHOD OF AUTOMATICALLY ADJUSTING INTERRUPT FREQUENCY

(75) Inventor: Yeun-Renn Ting, Taoyuan (TW)

(73) Assignee: Chung-Shan Institute of Science & Technology, Tao-Yuan (TW)

(*) Notice: Subject to any disclaimer, the term of this patent is extended or adjusted under 35 U.S.C. 154(b) by 0 days.

(21) Appl. No.: 09/359,978

(22) Filed: Jul. 23, 1999

(51) Int. Cl.$^7$ ............................................. G06F 13/24
(52) U.S. Cl. ...................................... 710/260; 713/502
(58) Field of Search ................................ 710/260, 266; 713/400, 502

(56) References Cited

U.S. PATENT DOCUMENTS

| | | | | |
|---|---|---|---|---|
| 4,708,491 A | * | 11/1987 | Luitje ........................ | 368/156 |
| 4,903,251 A | * | 2/1990 | Chapman .................... | 368/156 |
| 5,392,435 A | * | 2/1995 | Masui et al. ................ | 710/260 |
| 5,535,380 A | * | 7/1996 | Bergkvist, Jr. et al. ..... | 713/502 |
| 6,141,296 A | * | 10/2000 | Progar ........................ | 368/156 |

* cited by examiner

*Primary Examiner*—Peter Wong
*Assistant Examiner*—Xuong Chung-Trans
(74) *Attorney, Agent, or Firm*—Darby & Darby

(57) ABSTRACT

This invention provides a method of automatically adjusting interrupt frequency. The following steps are provided. First, a computer system is provided with an operating system able to deliver a plurality of interrupts with a first interrupt frequency. A counter is used to count a number of occurrences of the interrupt until the number reaches a predetermined number, and then the counter is reset to zero. The predetermined number is divided by the first interrupt frequency to obtain a product, and calculate an error between the product and an actual period of time elapsed for the predetermined number of interrupts is calculated. Lastly, the invention detects whether the error exceeds a predetermined range and adjusting the first interrupt frequency to limit the error within said predetermined range.

5 Claims, 2 Drawing Sheets

METHOD OF AUTOMATICALLY ADJUSTING INTERRUPT FREQUENCY

BACKGROUND OF THE INVENTION

1. Field of the Invention

The present invention generally relates to a method of adjusting interrupt frequency. Specifically, it is related to a method of automatically adjusting an interrupt interval by rectifying the interrupt frequency error.

2. Description of Related Art

Previously, real time control was mostly applied in research and design of computer architectures for artificial intelligence applications or workstations. Recently, the executing speed and performance of the personal computer have been extensively improved, and thus it is possible that real time control to be implemented in the personal computers to conduct research faster, thereby saving cost.

The most significant bottleneck in the application of real time control to the personal computer is how to obtain real interrupts in which the time interval between two interrupts is about few micro second (ms). Thus far, real interrupts with a few ms time interval play an important role in industrial and military fields. In general, there are two methods, software or hardware, to achieve such real interrupts.

For example, using the software method, a timer for counting the interrupts can be applied to conduct timing for many applications, for example producing games, multimedia applications, and even the hold responses of connection programs used in networks. Additionally, the expiry time built into the shareware is also determined by the timer.

Current system chips in personal computers send approximately one interrupt request per 55 ms, i.e., 18.2 requests per second. In fact, for program software like Microsoft Virtual Basic or Borland Delphi, if the interrupt interval is required to be 10 ms, such program software still supplies 55 ms as an interrupt interval. The reason is that the timer applied in current program software generates an interrupt note every 18.2 ms to the computer system according to DOS, in which the Interrupt Service Routine (ISR) is called for by the program software.

Table 1 shows results of an interval comparison, in which required interrupt intervals are 1 ms, 10 ms, 20 ms, 50 ms, 100 ms, and 1000 ms, in two operating systems, Windows 95 and Windows NT. It is obvious that the various interrupt intervals generated by the timer of such program software can not achieve strict precision.

| A B | 1 ms | 10 ms | 20 ms | 50 ms | 100 ms | 1000 ms |
|---|---|---|---|---|---|---|
| Windows 95 SetTimer | 55.04 ms | 55.89 ms | 57.03 ms | 57.96 ms | 113.6 ms | 1039.4 ms |
| Windows NT SetTimer | 10.21 ms | 10.21 ms | 20.03 ms | 50.07 ms | 100.2 ms | 1001.5 ms |

A: required interval
B: OS function

On the other hand, using the hardware method, an interface, for example the interface card PCL830 manufactured by Advantech, may be added into the computer system to provide an accurate interrupt interval. However, several disadvantages still exist. First, the computer system needs to provide an extra interrupt request (IRQ) for such an interface. Moreover, a driver program must be designed to match the software program and thus the cost of the hardware and/or software increases.

SUMMARY OF THE INVENTION

It is therefore an object of the present invention to provide a method of adjusting an interrupt interval (or interrupt frequency) dynamically. Through the method disclosed in the present invention, the resolution of the precision of the interrupt interval for the computer system can be improved to a micro-second degree.

The method of dynamically adjusting the interrupt interval for a computer system comprises following steps. First, provide a computer system with an operating system able to deliver a plurality of interrupts with a first interrupt frequency. Then a counter is used to count a number of occurrences of said interrupt until said number reaches a predetermined number, and then reset said counter to zero. Next, divide said predetermined number by said first interrupt frequency to obtain a product, and calculate an error between said product and a period of time that said predetermined number of interrupts actually took. Lastly, detect whether said error exceeds a predetermined range so as to adjust said first interrupt frequency for limiting said error within said predetermined range.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

Figure 1:
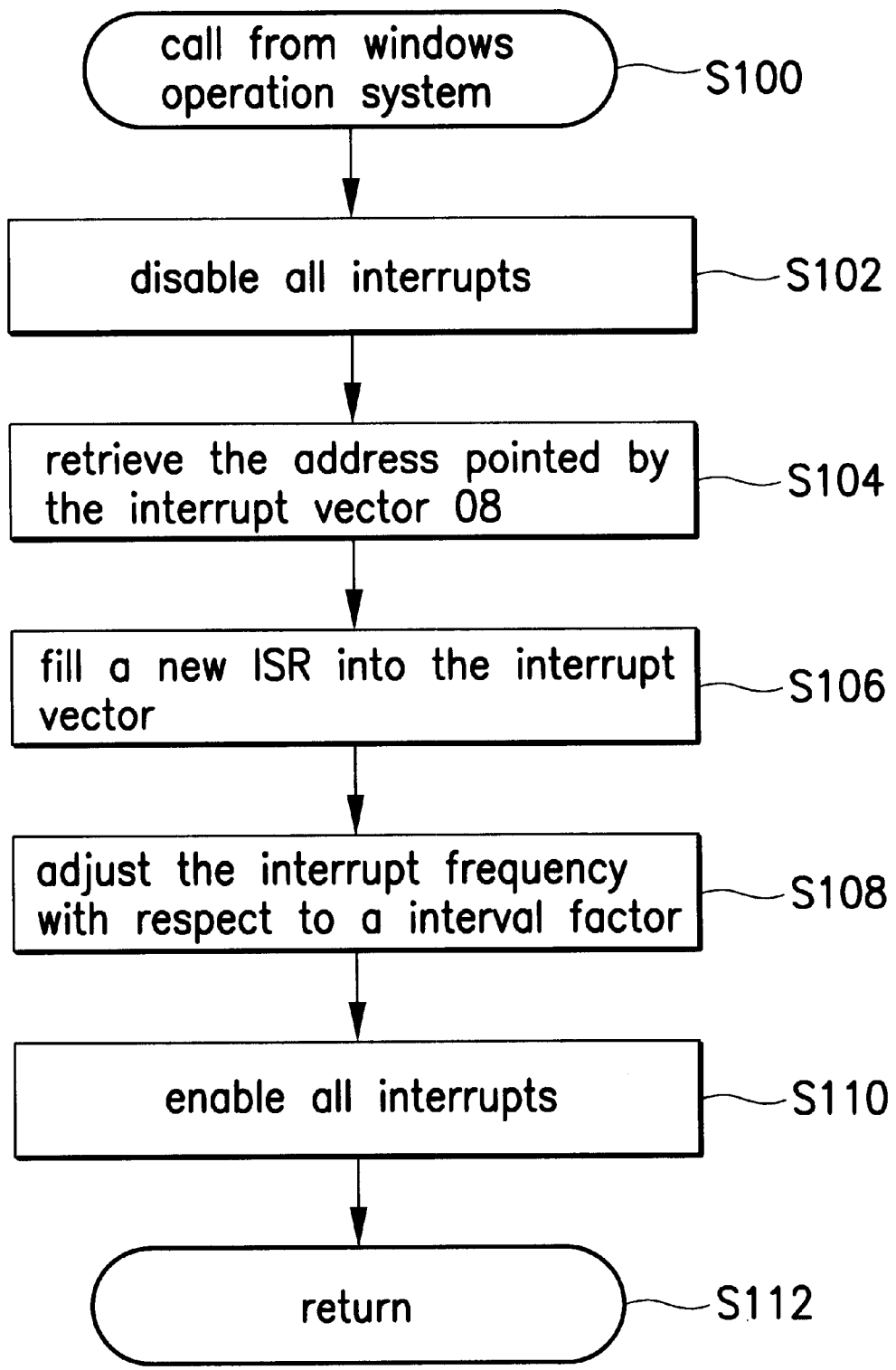
FIG. 1 illustrates a flow chart of adjusting an interrupt interval in a preferred embodiment of the present invention.

In the prior art, the easiest method to obtain interrupt intervals in a computer system is to follow the clock generated by the oscillators of the computer. Assume that the clock frequency is 1.1933 MHz. Since the timer vector of most computer systems is 08, fill a recall function into the timer vector, the relative program steps comprising:

OldISR=getvect(08);

Setvect=(08, NewISR);

In fact, the interrupt frequency by the above method is 1/18.2 per second, which means the interrupt interval is still about 55 ms. The next two program steps can adjust the interrupt frequency:

outp(0x40, 0x9d);

outp(0x40, 0x2e);

The address 0x40 has a value 11933 determined by the high and low bits, which respectively store 0x9d and 0x2e in hexadecimal numbers. Then divide the oscillator frequency 1.1933 MHz by the value 11933 (hereafter, called the interval factor) stored in the address 0x40 to obtain a desired interrupt frequency:

1.1933 MHz/0x2e9d=1193300 Hz/11933=100 Hz;

i.e. the interrupt interval can be changed from 55 ms to 10 ms.

Hence, by the same method, if 1 ms is the desired interrupt interval, change the interval factor stored in the address 0x40 as 0x4 in the high bits and as 0xa9 in the low bits; then the interrupt frequency becomes:

1.1933 MHz/0x4a9=1193300 Hz/1194=1000 Hz;

i.e. the interrupt interval can be changed from 55 ms to 1 ms.

By the above four program steps, a desired interrupt interval or frequency can be obtained based upon the available oscillator frequency. But the frequencies delivered from the oscillators associated with different computers are different. In the other words, the interval factor predetermined with respect to the oscillator frequency is suited for specific computer systems only. For example, if an oscillator of another computer has a frequency different than 1.1933 MHz, for example 1.193182 MHz, using the above steps to obtain an interrupt interval 1 ms would produce the following result:

1.193182 MHz/1193=1000.1525 Hz;

and transferring this frequency to an interval time would produce the following result:

1/1000.1525 Hz=0.00099985 s=0.99985 ms.

It can be seen that there is a time error of 0.00015 ms between this interval time 0.99985 ms and the desired interval time 1 ms. After a period of time, the total time error increases over the accumulated intervals to induce the computer system to execute commands or determinations at the wrong time. Especially in industry and military fields, strictly correct time information is necessary to maintain stable operations.

The present invention provides a method of adjusting an interrupt interval by finely changing the interval factor dependent on the desired interval time.

In the preferred embodiment, several functions of the computer language C++ are applied to develop the program of the invention. It is to be understood that others skilled in the art may practice various other embodiments with other computer languages.

There are 8 functions in the C++ application library used to implement the preferred embodiment, which comprise:

void SetCallBack(void (*fun) (void));

void RemoveCallBack( );

int CreateCount( );

unsigned long GetCount(int);

void ResetCount(int);

void TuneQuick( );

void TuneSlow( ); and void AutoTune( );

In the above 8 functions, SetCallBack(void (*fun)(void)) is used to set a call-back function, i.e., ISR; RemoveCallBack( ) is used to delete said call-back function and recover the interrupt frequency; CreateCount( ) is used to generate a counter; GetCount(int) is used to obtain said counter; ResetCount(int) is used to reset said counter to zero; when the interrupt frequency is too slow, TuneQuick( ) is called to finely adjust the interrupt frequency to be faster by decreasing the interval factor stored in the address 0x40 by 1; when the interrupt frequency is too fast, TuneSlow( ) is called to finely adjust the interrupt frequency to be slower by increasing the interval factor stored in the address 0x40 by 1; and AutoTune( ) is used to determine whether to speed or slow down the interrupt frequency.

Referring to FIG. 1, the flow chart shows the program AutoTune( ) finely adjusting the interrupt interval in the preferred embodiment of the present invention. First, disable all interrupts through the Windows operating system executed in the computer system (S102). The purpose of the above step S102 is to prevent an unstable state caused by other interrupts while the interrupt vector is being set. Next, retrieve the address of the interrupt vector 08 (S104) and fill a new ISR into the interrupt vector (S106). Thereafter, detect the interrupt frequency and finely adjust and reset it based upon an interval factor (S108) Lastly, enable the interrupt disabled in step S102 (S110) and return to the Windows operating system (S112).

Figure 2:
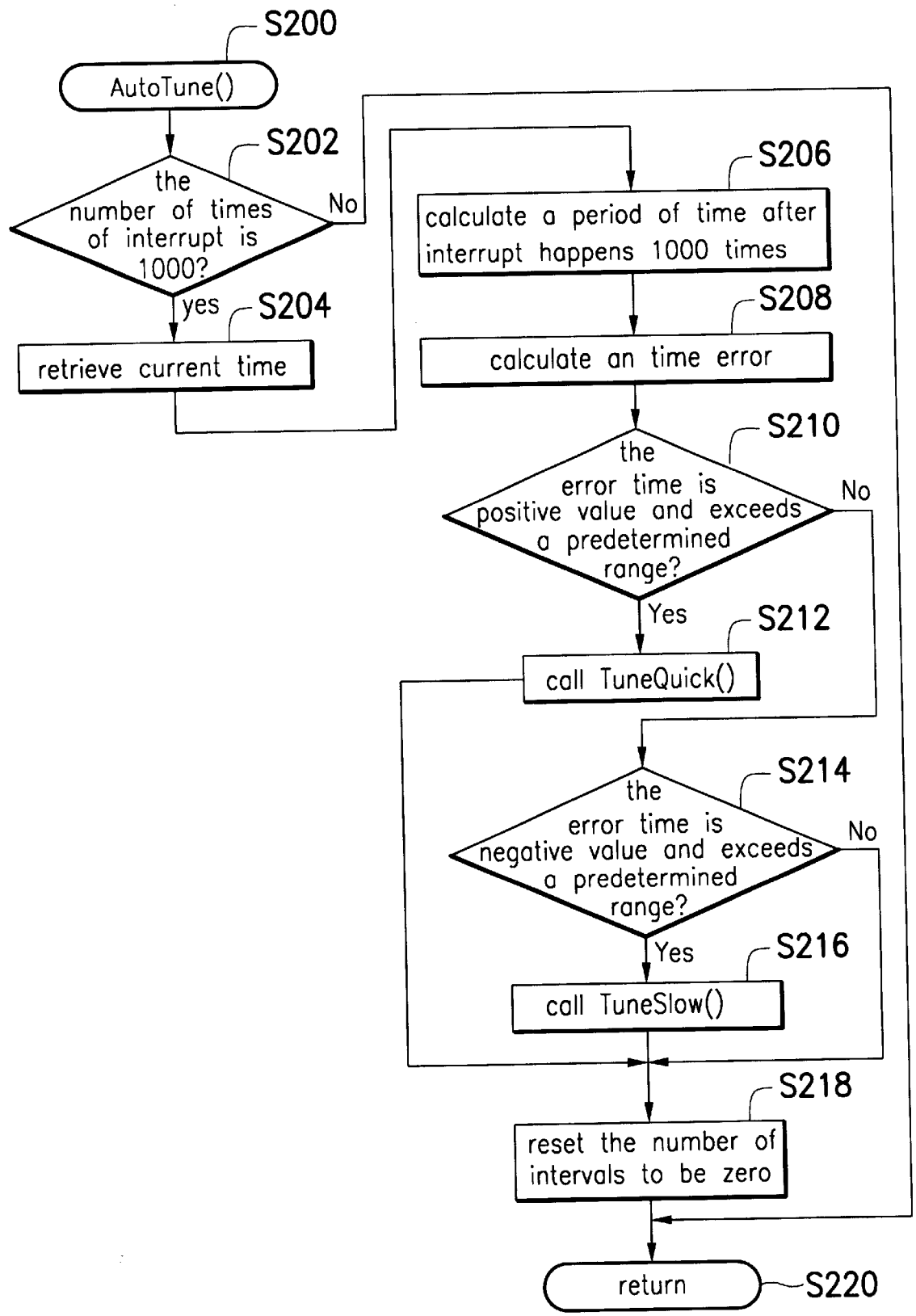
FIG. 2 is a flow chart illustrating in detail how to automatically detect the interrupt frequency and dynamically adjust the interrupt interval in the present invention.

FIG. 2 is a flow chart illustrating in detail how to automatically detect the interrupt frequency and dynamically adjust the interrupt interval in the present invention. The described functions are applied within the following steps. A counter is generated by CreateCount( ) to count the number of occurrences of interrupt (S202). When a predetermined number is counted (in the preferred embodiment, the predetermined number is 1000), calculate an error (S208) between an actual period of time for 1000 occurrences of interrupt interval (S204) and 1000×one interval time (S206). If the actual period of time is longer than 1000×one interval time, increase the interval factor. Conversely, if the actual period time is shorter than 1000× one interval time, decrease the interval factor.

Consequently, this program AutoTune( ) must determine whether the error value exceeds a predetermined range with respect to said predetermined counting number, which in this embodiment is 1000. If the error value is positive (S210), i.e., the actual period time is shorter than 1000×one interval time, call the TuneQuick( ) to speed up the interrupt frequency (S212). The method of speeding up the interrupt frequency is applied by the steps S106 and S108 illustrated in FIG. 1, for example, decrease the interval factor by 1 to finely increase the interrupt frequency.

After the interrupt frequency is increased, the counting number in the counter is reset to zero (S218), and then return back to the Windows operating system (S220) Lastly, the new interrupt frequency can be used for any software involving interrupts.

If the error value is negative (S210), i.e., the actual period time is longer than 1000×one interval time (S214), call the TuneSlow( ) to slow down the interrupt frequency (S216). The method of slowing down the interrupt frequency is applied by the steps S106 and S108 illustrated in FIG. 1, for example, by increasing the interval factor by 1 to finely decrease the interrupt frequency.

Similarly, after the interrupt frequency is decreased, the counting number in the counter is reset to be zero (S218), and then return back to the windows operating system (S220). Lastly, the new interrupt frequency can be used for any software related with interrupts.

In fact, the program of AutoTune( ) is a resident routine in the operating system, so the interrupt interval is continuously monitored by determining the actual versus calculated time to control the error value within the determined range.

Table 2 shows results of an interval comparison according to the method of the present invention, in which the required interrupt intervals are 1 ms, 10 ms, 20 ms, 50 ms, 100 ms, and 1000 ms, in three types of operating system, Windows 95, Windows NT and Microsoft DOS. It is obvious that the results in Table 2 are closer to the required interrupt intervals than the ones in Table 1. The time error caused by the interval time can be inhibited to improve the stability and timing precision of the computer systems.

| A B | 1 ms | 10 ms | 20 ms | 50 ms | 100 ms | 1000 ms |
|---|---|---|---|---|---|---|
| Windows 95 SetTimer | 0.999 ms | 9.99 ms | 19.99 ms | 49.95 ms | 99.91 ms | 999.8 ms |
| Windows NT SetTimer | 0.999 ms | 9.99 ms | 19.99 ms | 49.98 ms | 99.96 ms | 999.7 ms |
| MS DOS | 0.999 ms | 9.99 ms | 19.99 ms | 49.96 ms | 99.93 ms | 999.4 ms |

A: required interval
B: OS function

Furthermore, in the steps S206 and S208 shown in FIG. 2, the predetermined counting number (1000 in the preferred embodiment) can be adjusted depended on the physical operating system or hardware/software applied in the computer system. In general, 1000 is suitable for a computer system working for a long time.

The foregoing description of preferred embodiments of the present invention has been provided for the purposes of illustration and description. It is not intended to be exhaustive or to limit the invention to the precise forms disclosed. The embodiments were chosen and described to best explain the principles of the invention and its practical application, thereby enabling others skilled in the art to understand the invention and to practice various other embodiments and make various modifications suited to the particular use contemplated. It is intended that the following claims or their equivalents define the scope of the invention.

What is claimed is:

1. A method of automatically adjusting interrupt interval, comprising
    (a) providing a computer system with an operating system able to deliver a plurality of interrupts with a first interrupt frequency;
    (b) providing a counter used to count a number of occurrences of said interrupts until said number reaches a predetermined number, and then resetting said counter to zero;
    (c) dividing said predetermined number by said first interrupt frequency to obtain a product, and calculating an error between said product and an actual period of time elapsed for said predetermined number of interrupts to occur;
    (d) detecting whether said error exceeds a predetermined range;
    (e) adjusting said first interrupt frequency for limiting said error within said predetermined range.

2. The method of claim 1, wherein during said step (a) said first interrupt frequency is provided from an oscillation frequency in said computer system divided by a first interval factor.

3. The method of claim 2, further comprising:
    (f) retrieving a time interrupt vector of said computer system;
    (g) retrieving an address pointed to by said time vector of said computer system;
    (h) filling a second interval factor into said address to adjust said first interrupt frequency; and
    (i) returning a second interrupt frequency with respect to said second interval factor to said operating system to maintain said error within said predetermined range.

4. The method of claim 3, wherein said step (h) comprises generating said second interval shorter than said first interval if said product is larger than said period of time actually elapsed for said predetermined number of interrupts to occur.

5. The method of claim 3, wherein said step (h) comprises generating said second interval longer than said first interval if said product is smaller than said period of time actually elapsed for said predetermined number of interrupts to occur.

* * * * *